No. 812,357. PATENTED FEB. 13, 1906.
J. P. NEVILLE.
DRY METHOD OF PREPARING LEAD COMPOUNDS.
APPLICATION FILED AUG. 29, 1905.
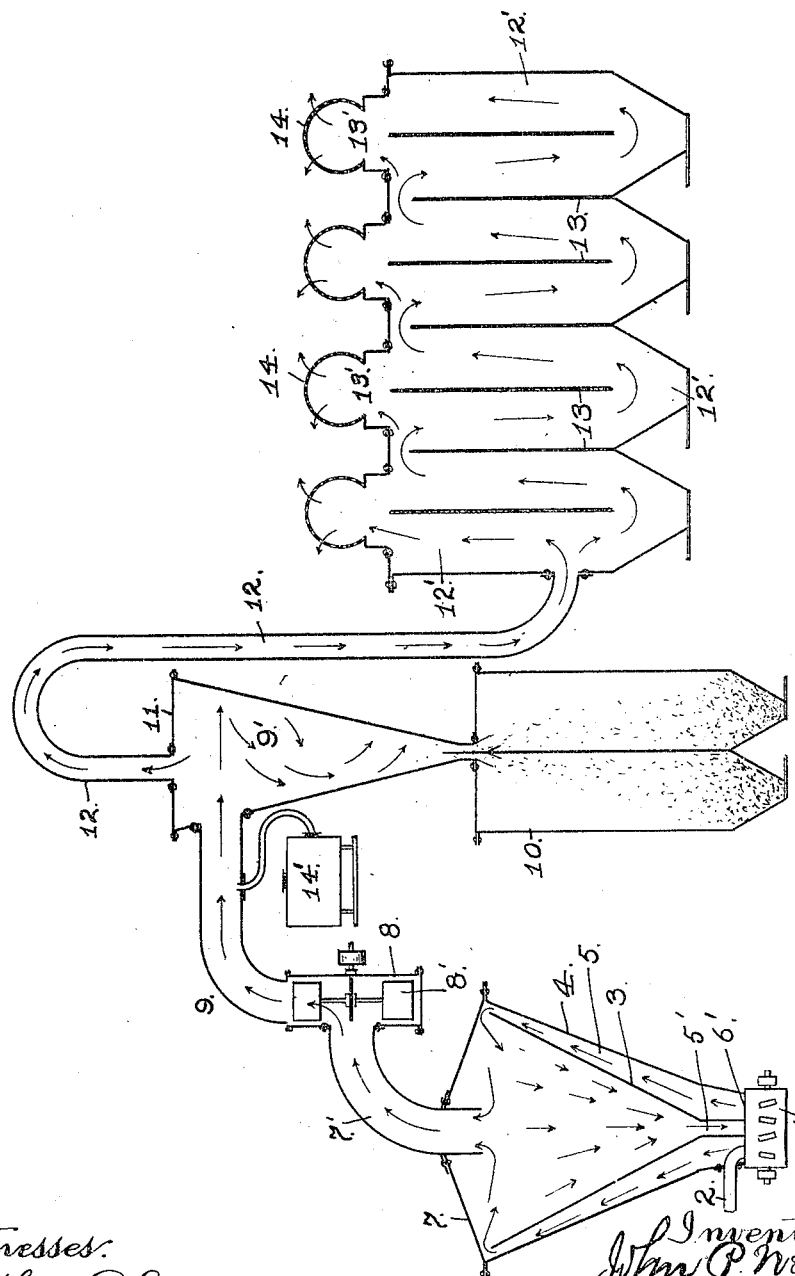

UNITED STATES PATENT OFFICE.

JOHN P. NEVILLE, OF OAKLAND, CALIFORNIA.

DRY METHOD OF PREPARING LEAD COMPOUNDS.

No. 812,357. Specification of Letters Patent. Patented Feb. 13, 1906.

Application filed August 29, 1905. Serial No. 276,246.

*To all whom it may concern:*

Be it known that I, JOHN P. NEVILLE, a citizen of the United States, residing in the city of Oakland, county of Alameda, State of California, have invented certain new and useful Improvements in Dry Methods of Preparing Lead Compounds; and I hereby declare the following to be a full, clear, and exact description of the same.

The present invention relates to the treatment of lead compounds as received from the corroding pans and furnaces, the object being to reduce the lead carbonates and oxids so received in a dry condition instead of using moisture for the purpose of reducing the material received from the said corroding pans and furnaces.

The method at present most generally resorted to in the treatment of lead carbonate and oxids for commercial purposes is to separate the metallic lead from the carbonate of lead and then to mix the carbonate of lead with water to form a pulp, which is ground by running the mass through suitable "burstones," thence adding additional water, and stirring until the ground material is of the consistency of milk, which is then passed through a series of settling-tubs. In the first of these tubs the coarse carbonate of lead settles and is collected for regrinding, the fine particles float over into the successive tubs and finally settle into the consistency of thick cream. This thick heavy mixture of carbonate of lead is then placed on large copper pans, which are heated until the water is evaporated. Such method requires from one week to ten days in which to successfully treat the material and place the same in condition for commercial purposes.

The improved method consists in subjecting the carbonate of lead to the action of a high-speed pulverizer, so as to reduce the same to a fine impalpable powder, the powder so produced being through the medium of an air-suction drawn from within the pulverizer and caused to spread in a thin layer during its course of upward travel to an arrester, into which the powder-laden air is discharged. The heavier particles of the pulverized lead carbonate settle within the arrester by gravity and fall into a settling or storage bin located thereunder to receive such particles, while the lighter particles of the powdered lead carbonate are carried from the arrester by the outward current of air and deposited within a suitable collector, into which the particles of lead carbonate are separated from the body of air escaping therefrom. To facilitate the separation of the lead particles within the arrester, the dust-laden air entering therein is given a whirling action which confines the body of air therein for a longer period of time and permits of a more effectual separation of the heavier particles of the pulverized lead carbonate from the lighter particles. The material recovered from the settling or storage bin and from the collector is in condition for commercial purposes—that is, ready for grinding in oil or to be packed dry in packages for shipment.

It will thus be noted that the method of treating the material is a perfectly dry one, the mixing of the carbonate of lead with water and the grinding of the lead-pulp thus formed being dispensed with, likewise the time consumed in decanting the ground and rewatered material and in drying out the collected material being saved. The result is the treatment of a larger quantity of material per day, a lessening of the time required to place the carbonate of lead in a commercial condition, and the treating of the material at a considerably-lessened expense.

In order to destroy any particle of tanbark or other organic matter, also any acetate of lead which may be contained in the lead carbonate, so as to improve the product and produce a finer and whiter quality of white lead, the current of lead-laden air is caused to pass through an atmosphere of gas, such as ozone, which oxidizes and eliminates the foreign substances, thereby freeing the pulverized particles of lead carbonate of its impurities.

It will be understood that the foregoing method applies equally as well in the treatment of red lead and litharge and pigment.

In the drawing accompanying the present application an apparatus for successfully carrying out the described method is illustrated, the drawing disclosing a longitudinal vertical sectional view of the apparatus.

In brief, the apparatus comprises a pulverizer 1, into which the material to be treated is delivered by the feed 2. Above the pulverizer is arranged a funnel 3, which is surrounded by an outer funnel 4 between the funnels, there being an annular passage-way 5. The inner funnel has an open bottom 5', which communicates with the pulverizer 1, the upper end of said funnel being an open one. The bottom of the outer funnel 4 is also an open one, and it communicates with the chamber 6' of the pulverizer, which receives the pulverized material. However, the said funnel is formed with a closed top wall 7, through which wall extends a suction-pipe 7'. The said suction-pipe communicates with the exhauster 8, within which works a suction-fan 8'. From the exhauster leads an outlet-pipe 9, which enters an inverted-cone-shaped arrester 9'. This arrester is mounted above the settling chamber or bin 10, the bottom thereof being opened so as to establish a direct communication between the interior of the arrester and the settling chamber or bin 10.

The arrester is provided with a closed top 11, through which extends an outlet-pipe 12. The lower end of this pipe enters a collector 12', within which a series of plates 13 is secured. The outlets 13' of the collector are covered with any suitable fine-mesh covering 14, which acts to strain the escaping air of any particles of fine lead carried thereby.

Intermediate the exhauster 8 and the arrester 9' there is introduced an electrical generator 14' for the creating of ozone, which gas is discharged into the connecting or outlet pipe 9, so as to impregnate the dust-laden air passing therethrough with the said gas, in order to oxidize and eliminate any foreign substance and oxidize any acetate of lead which may be contained in the particles of lead carbonates.

In carrying out the method of dry preparation of lead carbonate for commercial purposes the carbonate of lead as received from the corroding pans and furnaces is fed directly into the pulverizer, where it is ground into a fine powder. At the same time the exhaust-fan is put into operation, so as to create sufficient suction to raise the pulverized material within the annular passageway 5, lifting the same over the upper edge of the funnel 3 and drawing the same as a thin film in a horizontal direction toward the suction-pipe 7', into which it enters and is delivered by the outlet-pipe 9 into the arrester 9'. Such of the raised particles as are too heavy to float as conveyed toward the suction-pipe 7' fall by gravity into the open funnel 3 and are redelivered to the pulverizer 1 for recrushing. The dust-laden air as conveyed from the exhauster to the arrester is impregnated with ozone, which gas oxidizes and eliminates such foreign substances and oxidizes such acetate of lead as may be contained therein. As the dust-laden air enters the arrester the heavier particles contained therein fall by gravity and enter the settling chamber or bin 10, while the lighter particles are carried off through the pipe 12 and are delivered with the air into the collector 12'. The flow of air is arrested within the collector 12' by the baffle-plates 13 and the particles of lead carbonate contained within the air permitted to settle in the collector. Such of the material as fails to settle owing to its extreme lightness will be strained from the air and recovered as the air escapes through the mesh-covered outlets 13'.

Having thus described the invention, what is claimed as new, and desired to be protected by Letters Patent, is—

1. The dry method of preparing white lead, red lead and litharge for commercial use which consists in subjecting the material to be treated to the action of a pulverizer to reduce it into a powder, withdrawing by air-suction the powder from within the pulverizer, and discharging the dust-laden air into an arrester wherein the heavier particles of carbonate of lead separate by gravity from the laden air.

2. The dry method of preparing white lead, red lead and litharge for commercial use, which consists in converting the material to be treated into a powder, withdrawing the powdered material by air-suction, discharging the dust-laden air into an arrester wherein the heavier particles of lead separate by gravity from the laden air, and finally discharging the air from the arrester into a collector to free the air of any particles of carbonate of lead carried thereby.

3. The dry method of preparing carbonate of lead for commercial use, the same consisting in reducing the material to be treated into a powder, withdrawing by air-suction the powdered material, discharging the dust-laden air into a suitable collector for separating the lead particles from the dust-laden air and impregnating the flowing body of dust-laden air with a gas, such as ozone, to oxidize and eliminate all foreign substances and such acetate of lead as may be contained in the powdered carbonate carried by the body of air.

4. The dry method of preparing carbonate of lead for commercial use, which consists in reducing the material to be treated to a powder, withdrawing the powder thus formed by a flowing body of air, and impregnating the flowing body of dust-laden air with a gas—such as ozone—to oxidize and eliminate all foreign substance and oxidize such acetate of lead as may be contained in the powdered carbonate carried by the body of air, and finally separating the dust-laden air of the particles of lead carbonate held therein.

In testimony whereof I have hereunto set my hand.

JOHN P. NEVILLE.

Witnesses:
   J. COMPTON,
   D. P RICHARDS.